United States Patent [19]
Kaschemekat et al.

[11] Patent Number: 5,205,843
[45] Date of Patent: Apr. 27, 1993

[54] PROCESS FOR REMOVING CONDENSABLE COMPONENTS FROM GAS STREAMS

[75] Inventors: Jürgen Kaschemekat; Richard W. Baker, both of Palo Alto; Johannes G. Wijmans, Menlo Park, all of Calif.

[73] Assignee: Membrane Technology and Research, Inc., Menlo Park, Calif.

[21] Appl. No.: 836,101

[22] Filed: Feb. 14, 1992

Related U.S. Application Data

[63] Continuation-in-part of Ser. No. 649,305, Jan. 30, 1991, Pat. No. 5,089,033, which is a continuation of Ser. No. 432,592, Nov. 7, 1989, abandoned.

[51] Int. Cl.$^5$ ............................................. B01D 53/22
[52] U.S. Cl. .......................................... 55/16; 55/23; 55/31; 55/68; 55/73
[58] Field of Search ............... 55/16, 23, 68, 73, 158, 55/31, 33, 74; 62/18

[56] References Cited

U.S. PATENT DOCUMENTS

| | | | |
|---|---|---|---|
| 3,250,080 | 5/1966 | Garwin | 55/16 X |
| 3,324,626 | 6/1967 | Dresser et al. | 55/23 X |
| 4,119,417 | 10/1978 | Heki et al. | 55/16 X |
| 4,243,701 | 1/1981 | Riley et al. | 55/158 X |
| 4,264,338 | 4/1981 | Null | 55/16 |
| 4,435,191 | 3/1984 | Graham | 55/16 |
| 4,444,571 | 4/1984 | Matson | 55/16 |
| 4,529,411 | 7/1985 | Goddin, Jr. et al. | 55/16 |
| 4,553,983 | 11/1985 | Baker | 55/16 |
| 4,599,096 | 7/1986 | Burr | 55/16 X |
| 4,602,477 | 7/1986 | Lucadamo | 55/158 X |
| 4,639,257 | 1/1987 | Duckett et al. | 55/16 |
| 4,654,063 | 3/1987 | Auvil et al. | 55/158 X |
| 4,675,030 | 6/1987 | Czarnecki et al. | 55/158 X |
| 4,717,407 | 1/1988 | Choe et al. | 55/158 X |
| 4,758,250 | 7/1988 | Laciak et al. | 55/158 X |
| 4,772,295 | 9/1988 | Kato et al. | 55/16 |
| 4,817,392 | 4/1989 | Agrawal et al. | 62/18 |
| 4,881,953 | 11/1989 | Prasad et al. | 55/16 |
| 4,906,256 | 3/1990 | Baker et al. | 55/16 |
| 4,963,165 | 10/1990 | Blume et al. | 55/16 |
| 4,994,094 | 2/1991 | Behling et al. | 55/16 |
| 5,064,447 | 11/1991 | Lee | 55/16 |
| 5,089,033 | 2/1992 | Wijmans | 55/16 |

FOREIGN PATENT DOCUMENTS

| | | | |
|---|---|---|---|
| 0100923 | 2/1984 | European Pat. Off. | 55/16 |
| 0186843 | 7/1986 | European Pat. Off. | 55/16 |
| 0329962 | 8/1989 | European Pat. Off. | |
| 3824400 | 1/1990 | Fed. Rep. of Germany. | |
| 63-175602 | 7/1988 | Japan | 55/16 |

OTHER PUBLICATIONS

S. S. Kremen, "Technology & Engineering of ROGA Spiral-Wound Reverse Osmosis Membrane Modules", 1977, pp. 371-385, in Reverse Osmosis & Synthetic Membranes, National Research Council of Canada.

Y. Shindo et al., "Calculation Methods for Multicomponent Gas Separation", 1985, pp. 445-459, Sep. Sci. & Tech., 20(5&6) Marcel Dekker, Inc.

R. D. Behling, "Separation of Hydrocarbon Vapors from Air", 1988, 6th Annual Membrane Technology Planning Conference Proceed, BCC Communications, Mar. 1989.

*Primary Examiner*—Robert Spitzer
*Attorney, Agent, or Firm*—J. Farrant

[57] ABSTRACT

A process for treating a gas stream to remove or recover a condensable component. The process involves a condensation step followed by a membrane concentration step. The process is useful in treating raw gas streams containing low concentrations of the condensable component, in treating small-volume raw gas streams, as an alternative to processes that require multistage membrane separation systems, in treating raw gas streams that have the potential to form explosive mixtures, or in situations where the treated gas stream composition must meet narrow target specifications.

34 Claims, 12 Drawing Sheets

PROCESS FOR REMOVING CONDENSABLE COMPONENTS FROM GAS STREAMS

This application is a continuation-in-part of application Ser. No. 07/649,305, filed Jan. 30, 1991 now U.S Pat. No. 5,089,033, which is a continuation of Ser. No. 07/432,592, filed Nov. 7, 1989, now abandoned.

BACKGROUND OF THE INVENTION

Gas streams containing condensable components, such as sulfur dioxide or various organic vapors, arise from numerous industrial and commercial processes. Venting such gases to the atmosphere wastes resources and causes pollution problems. Industries throughout the world are, therefore, under increasing pressure to clean up waste gas emissions. A widely used treatment method is condensation. The idea is to cool and/or compress the gas beyond the dewpoint of the condensable constituent. A portion of the condensable component will then condense out and can be drawn off in liquid form for reuse or disposal. The degree of removal that can be achieved in this way will depend on the initial concentration, the boiling point of the condensable, and the operating conditions of the process. Problems encountered in such processes are 1) low concentration of the condensable component in the stream, and/or low boiling point, so that the dew point is difficult to reach, and 2) need for regular defrosting. Compressing the gas stream above about 10-15 atmospheres requires large energy consumption and costs increase rapidly in proportion to compressor capacity. If the gas has to be cooled below 0° C., then ice formation in the condenser from water vapor entrained in the feed vapor may occur. Even if the gas stream is pre-dried, taking it down to cryogenic temperatures will again be a costly, energy intensive procedure. Many streams are currently too dilute for recovery by condensation under practical temperature and pressure conditions. Even where favorable operating conditions are possible, 20% or more of the condensable component may be left in the non-condensed bleed gas from the condenser.

Cryogenic condensation and compression/condensation units have been in widespread use for many years. Condensation is a valuable method of waste treatment and pollution control. Nevertheless there remains a longstanding need to improve condensation technology. Recent evidence concerning the adverse environmental effects of halogenated hydrocarbons and chlorofluorocarbons (CFCs) has dramatically intensified that need.

Combinations of membrane separation and condensation are known, including those described in copending U.S. application Ser. No. 07/649,305, now U.S. Pat. Nos. 5,089,033, and 4,994,094 and German patent application DE 38 24400 A1. Typically, the membrane separation step is performed first if the feed to be treated has a low condensable component concentration; the condensation step is performed first if the feed to be treated has a high condensable component concentration. Thus, both components of the process can operate in their more efficient ranges; the condenser on a stream that can more readily be brought to saturation and the membrane unit on a stream where a purified residue can be achieved at low stage cut, using modest membrane area. To perform the condensation step first on a dilute stream has been considered undesirable, because the condensation step then requires a higher pressure, a lower temperature, or both, than would be needed if the condensation step followed the membrane separation step. In the extreme case, if the raw feed stream to be treated were so dilute that it could not be brought to saturation under available pressure and temperature conditions, so that no condensation could take place, to attempt to perform the condensation step first would appear perverse.

SUMMARY OF THE INVENTION

The invention is a process for recovering a condensable component from a gas stream. The invention is a combination, or "hybrid", process that combines condensation with membrane separation, such that the membrane separation step always follows the condensation step. The condensable component is withdrawn as a liquefied product from the condenser. The process of the invention is in contradiction to the previous teachings described above. It has been found that there are situations where it is advantageous to perform first the condensation step, then the membrane separation step, even though the raw feed contains a low concentration of the condensable component, and even in the extreme case where the raw feed is so dilute that the "condensation" step, if performed alone, under the same conditions, would not bring the feed to saturation.

The membrane step is used to produce a concentrated permeate that is fed back and mixed with the raw feed. The increased concentration of the resulting incoming gas stream to the condensation step affects the condensation process in several ways:

(a) Condensation can now be achieved using lower pressure, higher temperature, or both, than would have been possible with the initial raw gas composition, (b) Using the same pressure and temperature conditions as would have been used to treat the raw gas alone will yield an increased flow of liquefied product, (c) Condensation can now be achieved with streams that would previously have not been saturated under the same pressure and temperature conditions.

The condensation step may be performed by simply chilling the gas stream to a temperature at which a portion of the condensable content of the stream will liquefy. Simple chilling may be efficient in situations where the boiling point of the condensable material is relatively high. Compressing the gas raises the dewpoint temperature, so a combination of compression and chilling will normally be the most efficient way to carry out the condensation step. Typically, the condensation step will involve running the gas stream through a compressor, then chilling it to a temperature below the dewpoint temperature at that pressure.

The membrane separation step may involve running the gas stream containing a condensable component across a membrane that is selectively permeable to that component. Thus, the membrane separation process produces a permeate stream enriched in the condensable component compared with the feed and a residue stream depleted in the condensable component. The membrane separation process may be configured in many possible ways. It is preferred to use only a single membrane stage, and this is rendered possible in many cases by the process of the invention. However, designs involving more complicated membrane arrays of two or more units in series or cascade arrangements could be used. Eighty to 90% or above removal of the condensable content of the feed to the membrane system can typically be achieved with an appropriately designed membrane separation process, leaving a residue stream containing only small amounts of the condensable material. The permeate stream is typically concentrated 2- to 200-fold compared with the feedstream.

The membrane separation step may involve using membranes that are selectively permeable to other components of the gas stream. In this case the nonpermeating, or residue, stream is enriched in the condensable component.

The gas stream to be treated by the process of the invention may be an effluent stream that would otherwise be discharged into the atmosphere untreated, or would be subject to some other treatment method or methods. Alternatively it may be an internal process stream from which it is desirable, for example, to recover an organic solvent for reuse. The process could be carried out by fitting a membrane unit to existing condensation units, or by installing a new combined condensation/membrane unit. Adding membrane units to existing condensation units is a relatively simple engineering task. The capital cost of the membrane equipment could be recovered within months in the most favorable applications.

If desired, the hybrid process can be designed to yield only two product streams: one, the condensed liquid, ready for use, reuse or discard, and two, a gas stream containing only a minor fraction of the original condensable content. In many cases, this gas stream may be clean enough for direct discharge or reuse. This result is achieved by recycling other streams within the process. Thus, no secondary wastes or pollution problems are created by the process.

The process of the invention also differs from the previous teachings as to preferred performance attributes. It has previously been considered generally desirable from the point of view of efficiency, particularly energy consumption, to combine condensation and membrane separation in such a way as to reduce the amount of gas that is cycled more than once through the condensation/membrane separation loop, and therefore, to achieve a high percentage of recovery, such as 70% or more, of the condensable component present in the feed to the condenser. These teachings remain valid; however, it has now been recognized that situations exist where an apparently inefficient arrangement, in terms of the amount of gas recycling through the system, may be advantageous when compared with alternative arrangements. The process of the invention may frequently, therefore, yield what would previously have been considered unacceptably low recovery of the condensable component reaching the condenser, even as low as a few percent. Thus a high percentage of the raw gas stream may cycle through the condensation/membrane separation loop repeatedly and the membrane stage cut may be high.

The advantages of the combination process include:
1. Condensation is frequently performed by first compressing the gas stream to be treated to an elevated pressure, such as 2-15 atmospheres, then chilling it. Consequently, the non-condensed fraction of gas leaving the condenser is often at high pressure. This high pressure can be used to provide the driving force for membrane permeation. The membrane separation step can then be carried out without supplying additional energy.
2. Some dilute feeds will require a two-stage or multistage membrane separation if the membrane separation step precedes the condensation step. The process of the invention obviates this requirement.
3. Some dilute feeds will require a compressor in the membrane permeate line if the membrane separation step precedes the condensation step. The process of the invention obviates this requirement.
4. If the condensation step precedes the membrane separation step, the feed gas to the membrane separation step will always be saturated under the pressure and temperature conditions of the condenser, even if the concentration of the condensable component in the raw gas changes. This then fixes the concentration of gas entering the membrane unit and in turn the approximate concentration of the gas leaving the membrane unit in the residue stream. In many pollution control and chemical processing applications, the ability to fix the concentration of gas leaving the unit is very desirable.

It is an object of the invention to provide a treatment process for handling gas streams containing a condensable component.

It is an object of the invention to provide a treatment process for handling gas streams containing a condensable component so that a high percentage of the condensable component can be recovered.

It is an object of the invention to provide a simple treatment process for handling gas streams containing a condensable component.

It is an object of the invention to reduce gas emissions to the atmosphere.

It is an object of the invention to reduce emissions of organic vapors to the atmosphere.

It is an object of the invention to improve the performance of condensation units for removing condensable components from gas streams.

It is an object of the invention to allow condensation units to be operated under conditions where they could not have been operated previously.

It is an object of the invention to provide a treatment process that includes only a single membrane stage for handling gas streams containing a dilute concentration of a condensable component.

It is an object of the invention to provide a treatment process for handling low-volume gas streams containing condensable components.

Other objects and advantages of the invention will be apparent from the description of the invention to those of ordinary skill in the art.

Although the process has principally been described in terms of a waste reduction or treatment technology, it should be clear that the process is equally applicable to the separation of condensable materials from any gas stream. The stream from which the condensable component is to be removed may be any gas, vapor or mixture including, but not limited to air, nitrogen, oxygen, carbon dioxide, methane, ethane or hydrogen.

It is to be understood that the above summary and the following detailed description are intended to explain and illustrate the invention without restricting its scope.

DETAILED DESCRIPTION OF THE INVENTION

Figure 1:
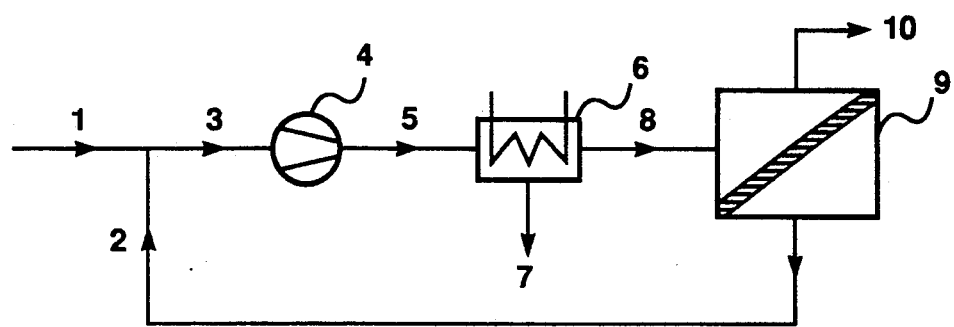
FIG. 1 shows a basic embodiment of the invention.

The terms condensable and condensable component as used herein refer to fluids below their critical temperatures and having boiling points greater than $-100°$ C. In the event that a mixture containing two or more condensable components is to be separated, the terms condensable and condensable component refer to the more readily condensable component or components.

The invention is a process for recovering a condensable component from a gas stream. The invention is a combination, or "hydrid", process that combines condensation with membrane separation, such that the membrane separation step always follows the condensation step. The condensable component is withdrawn as a liquefied product from the condenser.

The sources of the gas streams to be treated are diverse. Many industrial processes produce waste gas streams containing organic vapors. For example, solvent-containing containing airstreams are produced as a result of solvent vaporization in the drying of synthetic fibers and films, plastics, printing inks, paints and lacquers, enamels and other organic coatings. Solvents are also used in the preparation of adhesive coatings and tapes. Waste gases containing organic vapors are generated by solvent degreasing operations in the metal and semiconductor industries. The petroleum and petrochemical industries yield many gas streams containing hydrocarbon vapors. Such streams include atmospheric emissions released during loading, unloading, transfer or storage of raw materials and products, such as gasoline. They also include internal streams generated during refining and petrochemical manufacture. Commercial dry-cleaning facilities produce air emissions containing chlorinated hydrocarbons in large quantities; industrial dry-cleaning produces similar emissions containing naphtha. Chlorinated fluorocarbons (CFCs) are emitted to the atmosphere in huge quantities from plants manufacturing polyurethane and other plastic foams. Other sources of extensive CFC pollution are refrigeration operations, air conditioning and fire extinguisher filling and use. The concentration of these streams varies widely, from a few ppm to as high as 40–50% or more organic. Organic vapors that can be handled by the process include, but are not limited to, halocarbons of all kinds, including, but not limited to, partially and fully substituted fluorocarbons, chlorofluorocarbons (CFCS and HCFCs), brominated halocarbons and the like; chlorinated hydrocarbons, such as tetrachloroethylene, trichloroethylene; methylenechloride, 1,1,1-trichloroethane, 1,1,2-trichloroethane, carbon tetrachloride, chlorobenzene, dichlorobenzene; and non-halogenated hydrocarbons, such as acetone, xylene, ethyl acetate, ethyl benzene, ethyl ether, cyclohexane, ethanol, methanol, and other alcohols, cresols, nitrobenzene, toluene, methyl ethyl ketone, carbon disulfide, isobutanol, benzene, propane, butane, pentane, hexane and octane. Many of these organic-component-containing streams will comprise the organic material in air. Mixtures of organic components, such as gasoline, in nitrogen or carbon dioxide are also commonly encountered, because these gases are frequently used as blanketing or inerting gases. Streams of organic compounds in other gases, or streams comprising mixtures of organics are also found. For example, hydrogenation reactions in the chemical industry yield off-gas streams containing hydrogen and various hydrocarbons. Treatment of such streams could be carried out using a membrane type preferentially permeable to the hydrocarbon component or a membrane type preferentially permeable to hydrogen. Mixed organic component streams might arise, for example, from natural gas processing or petrochemical refining, where the stream could contain a mixture of methane, ethane, propane, butane and so on. Other streams that could be treated by the process of the invention include those containing sulfur dioxide or ammonia, for example. Numerous processes are being developed to remove acid gases from power plant flue gas. These schemes typically produce gas streams containing sulfur dioxide. Claus plants are a source of dilute sulfur dioxide streams. Thus it may be seen that there is an enormous diversity of potential applications for the present process throughout many different industries.

The process of the invention has two main steps, the condensation step followed by the membrane separation step.

The Condensation Step

The condensation step may involve chilling, compression or a combination of these. The goal of the condensation step is to bring the incoming gas stream to the dewpoint of the condensable component, so that a portion of the condensable component will liquefy. Preferably the gas stream will pass first through a compressor, where it is pressurized to a pressure in the range 1–15 atmospheres. Compression above about 15 atmospheres, and particularly above 20 atmospheres, is less desirable, because of the energy demands and consequent high cost. After compression, the gas is cooled, for example by running it through a condenser. The condenser may be water cooled, or may employ refrigerants that can take the gas down to lower temperatures. In cases where the condensable component is relatively concentrated in the gas stream, and where the boiling point is relatively high, then chilling without compression may be adequate to recover the bulk of the condensable material.

As far as the costs and energy requirements of chilling are concerned, several limits are discernable. Ideally, although it will frequently not be possible, the chiller temperature should be no lower than about 10° C., because this permits simple water cooling. The second limit, also very desirable, is that the chiller temperature be no lower than 0° C., because ice formation in the condenser is then avoided. Many, if not most, streams to be treated will contain water vapor. If the condenser temperature is below 0° C., periodic defrosting or dehydration pre-treatment will always be necessary. The third limit occurs at around −45° C. Temperatures down to about −45° C. should be possible to reach in a single-stage chilling operation, but costs will be relatively high compared with the two preferred options above. The fourth, and least preferred, mode of operation is to chill down to as low as −100° C. or below. This will normally require at least two chillers operating at progressively lower temperatures. The increase in energy requirements and costs is now sharp in comparison with the preferred modes. If the condensation step necessitates cooling to below 0° C., and the gas stream contains water vapor, then optionally the condensation step may use two chillers in series. The first chiller is maintained at a temperature above 0° C., and removes most of the entrained water. The second chiller is maintained at the lower temperature necessary to remove a substantial fraction of the condensable component. Some water vapor will inevitably pass into the second chiller but the use of the first chiller will significantly reduce the need for defrosting the second. The process of the invention could, alternatively or in addition, include a dehydration step carried out before the condensation step by means of a sorption unit wherein water vapor is sorbed into an appropriate solid or liquid, or by means of a membrane unit containing membranes electively permeable to water vapor, for example.

The amount of the condensable component that can be removed by condensation will depend on its boiling point, its concentration in the incoming gas stream to the condensation step, and the operating conditions under which the condensation is performed. Two of these three factors, concentration and operating conditions, are controllable. According to the invention, the incoming gas stream to be treated by the condensation step is made up of two components: one, raw gas as yet untreated by the process of the invention; and two, the condensable component enriched stream from the membrane separation step. Preferably, the incoming gas stream will be sufficiently enriched by admixture of the stream from the membrane separation step that its condensable component concentration will be at least twice that of the raw gas stream, more preferably it will be at least five times more concentrated, most preferably at least ten times more concentrated. High increases in concentration are possible because of the high degree of concentration that can be provided by the membrane separation step, discussed below.

The process of the invention is particularly applicable to handling low-concentration raw gas streams. By low-concentration raw gas streams are meant those in which the condensable component concentration is as low as 50%, 40%, 30%, 20%, 10%, 5% or less of the saturation concentration under ambient conditions. Even after the incoming gas stream concentration has been raised by mixing with the condensable component enriched stream from the membrane separation step, the incoming gas stream concentration may still be low compared with previously taught preferred concentrations for condensation, such as below 20%, 10% or less of the saturation concentration under ambient conditions. Thus the amount of liquefied product that can be recovered from the condenser without resorting to extreme pressure and temperature conditions may represent only a minor portion of the total condensable component content of the incoming gas stream, such as 50%, 40%, 30%, 20% 10%, 5% or less.

In some cases, the raw gas stream concentration may be below the saturation concentration at the pressure and temperature conditions under which the condensation step is to be performed. When the process is first started up, therefore, the entirety of the stream entering the condensation step will pass to the membrane separation step. The higher concentration of the enriched stream fed back from the membrane separation step will gradually raise the concentration of the incoming gas stream to the condensation step until it reaches the point where it can be brought to saturation and a flow of liquefied product will begin. The process will eventually reach the steady-state conditions under which a steady flow of liquefied product is achieved.

The condensation apparatus may be of the indirect or direct type. In indirect condensation, liquefaction is normally achieved by passing the coolant and the condensable material in heat transferring relationship, but not direct physical contact with each other, by flowing them on the inside and outside of a heat-exchange coil, for example. In direct condensation, the condensable material is absorbed directly into the coolant liquid. This type of condensation may be used in a liquid-ring pump, for example. The coolant may also be stored in a vessel and the stream to be condensed may be flowed into the vessel. In direct condensation, the condensable material, once condensed, can itself be used as coolant. For example, if hydrocarbons are the condensable component to be removed, recovered liquid hydrocarbon can be stored and used as the coolant.

The Membrane Separation Step

The membrane separation step may use a membrane that is relatively permeable to a condensable component of the stream, but relatively impermeable to other gases in the stream. Embodiments of the invention that use membranes that are selectively permeable to the non-condensable or less condensable component(s) of the feed gas are also possible. The membrane may take any form known in the art, such as a composite membrane, an asymmetric membrane, a homogeneous membrane, a membrane incorporating a gel or liquid layer, or dispersed particulates, etc. Composite membranes are preferred. The membranes may be in the form of flat sheets or hollow fibers, for example, and may be incorporated into plate-and-frame, potted fiber, spiral-wound or any other type of module. Where flat sheet membranes are used, spiral-wound modules are a preferred choice.

The choice of membrane material will depend upon the separation to be performed. Many specific examples are given in copending parent application U.S. Ser. No. 07/649,305, now U.S. Pat. No. 5,089,033. The membranes used in the invention should preferably have a selectivity for the preferentially permeating component of at least 5, more preferably at least 10 and most preferably at least 20. Using such membranes in conjunction with appropriate operating parameters will typically result in a condensable component enriched stream from the membrane separation step having a condensable component concentration at least two times that of the raw gas stream, more preferably at least five times more concentrated and most preferably at least 10 times more concentrated. If the membrane separation step produces a permeate enriched in the condensable component, the membrane separation step should preferably be designed to achieve removal of at least 50% of the condensable component reaching it, more preferably 70%, 80% or most preferably 90%, 95% or more.

If the membrane separation step produces a permeate enriched in the non-condensable component, then preferably at least 10% of the non-condensable component will be removed in a single pass, more preferably at least 20% and most preferably at least 50%. Very high removals of 90% or more are not required for this type of system, because the condensable-enriched residue from the membrane step remains at high pressure and can be recirculated to the condenser with little energy cost.

Since the membrane separation step follows the condensation step, gas passing to the membrane separation step will often be at a low temperature compared with room temperature and will be saturated with the condensable component at that temperature. It may contain liquid droplets of the condensable component swept out of the condenser with the non-condensed gas. A heater or heat exchanger may be positioned in the line between the condenser and the membrane unit to warm the feed stream to the membrane unit and reduce the possibility of liquid condensable component collecting on the membrane surface within the membrane modules.

A basic embodiment of the process of the invention is shown in FIG. 1. Referring now to this figure, raw gas stream, 1, containing a condensable component at a concentration A, which is subsaturation at the temperature and pressure conditions of the stream, is mixed with product stream, 2, from the membrane separation step. Stream 2, at concentration D, is the condensable component enriched stream from the membrane separation step, and may be the permeate stream, as shown in the figure, or the residue stream, depending on the type of membrane used. Streams 1 and 2 together form incoming gas stream, 3, which is at a higher concentration, B, of condensable component than stream 1 and which is passed through compressor, 4, to form compressed gas stream, 5. This stream passes through condenser, 6, to yield a condensed liquid stream of the condensable component, 7. The non-condensed fraction, 8, of the gas stream emerges from the condenser at concentration C, which is saturation concentration at the pressure and temperature of condensation, and passes to membrane separation unit, 9, which in the embodiment shown in the figure contains membranes selectively permeable to the condensable component. The non-permeating, residue stream, 10, is thus depleted in the condensable component. A driving force for membrane permeation is achieved by compressor 4. Optionally a vacuum pump could be provided on the permeate side of the membrane unit instead of, or in addition to, compressor 4. The permeate stream, 2, at concentration D, is enriched in the condensable component compared to the feed stream to the membrane unit and is returned and mixed with the raw gas stream for recompression and condensation.

Figure 2:
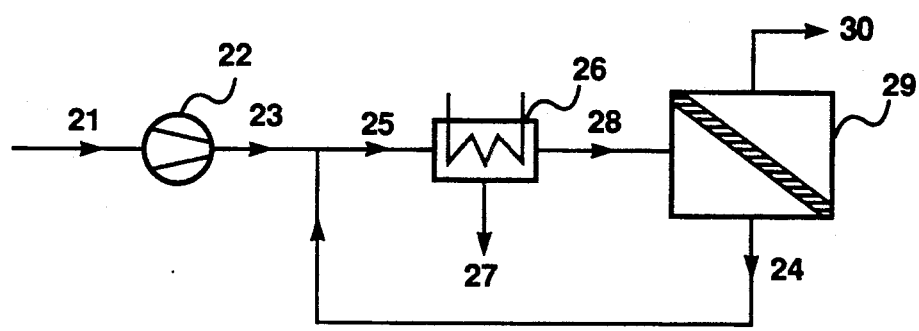
FIG. 2 shows an embodiment of the invention using a membrane selectively permeable to a non-condensable component of the gas stream.

FIG. 2 shows an embodiment of the invention using a membrane selective to the non-condensable component of the gas stream. Referring now to this figure, the raw gas stream, 21, containing a condensable component at a concentration A, which is subsaturation at the temperature and pressure conditions of the stream, is passed through compressor, 22, to form compressed gas stream, 23. This stream is mixed with stream 24, the high-pressure, residue stream from the membrane separation step, which is at concentration D. Stream 24 is the condensable component enriched stream in this case. Streams 23 and 24 together form incoming gas stream, 25, which is at a higher concentration, B, of condensable component than stream 21. Stream 25 passes through condenser, 26, to yield a condensed liquid stream of the condensable component, 27. The non-condensed fraction, 28, of the gas stream emerges from the condenser at concentration C, which is saturation concentration at the pressure and temperature of condensation, and passes to membrane separation unit, 29, which contains membranes selectively permeable to the non-condensable component. The non-permeating, residue stream, 24, is thus enriched in the condensable component, and can be returned to the condenser inlet without recompression. In this case, the permeate stream, 30, is the condensable-component-depleted stream. As with the embodiment of FIG. 1, an optional vacuum pump may be provided in the permeate line. A pump or blower may be connected in the residue line to pass the residue stream back to the condenser.

FIGS. 1 and 2 show basic process designs. Additional system components may be included as appropriate to the individual circumstances to enhance the performance of the process, including, but not limited to, a vacuum pump to reduce the pressure on the permeate side of the membrane, a dryer to remove water vapor at some point upstream of the condenser and a heater to warm the feed stream prior to entering the membrane unit.

The combination of the condensation step and the membrane separation step described above results in a process that may be particularly useful under conditions different from those previously described as desirable. As discussed above, the condensation step may be fed by a stream that contains only a low concentration of the condensable component compared with the saturation concentration under ambient conditions, and may recover only a low percentage of the condensable component reaching it. The membrane separation step may be operated at high stage cut; in other words a high percentage of the feed gas stream passes through the membrane to the permeate side and is recycled through the treatment loop. Even when the process of the invention is characterized by a large amount of recycle and a small amount of recovery, the process, although inefficient in some aspects, has been recognized to be of value.

In cases where the raw gas stream is so dilute that it is subsaturation even at the pressure and temperature conditions of the condensation step, then the relationship between concentrations A and C is $A<C$ and $A<C<B<D$. Concentration A may, in fact, be substantially below concentration C, such as below 80% C, below 60% C, below 50% C, below 30% C, below 20% C or below 10% C. Thus, the process of the invention is useful, even for streams that would previously have been considered far from a composition where treatment by condensation alone could be practical.

Nonlimiting examples of situations where comparative calculations may show the process of the invention to be of value include:

1. The raw gas stream to be treated contains a very dilute concentration of the condensable component: The permeate stream from a single-stage membrane separation operation may be too dilute for recovery by condensation. A two-stage or three-stage membrane system is required, therefore, if the membrane separation step precedes the condensation step. Multistage membrane systems are more complex than single-stage systems to design and construct. They may require a full set of ancillary equipment, such as vacuum pumps, compressors, valves and controls, for each stage. They are, therefore, more susceptible to operational problems.

In circumstances where it is preferred to avoid the use of a multistage membrane separation step, the process of the invention may be used as an alternative. When the process is started, the concentration of the incoming feed gas to the condensation step may be so low that no condensation occurs and the entire content of the mixed stream entering the condenser passes through as feed to the membrane separation step. This will in turn produce a higher concentration of the enriched stream from the membrane separation step to be fed back and mixed with the raw gas stream. After a time, the concentration of the incoming gas stream to the condensation step will reach saturation under the pressure and temperature conditions of the condensation step and a flow of liquefied product will begin. The process will eventually reach the steady-state conditions under which a steady flow of liquefied product can be withdrawn and the condenser off-gas passing to the membrane separation step is saturated with the condensable component under the conditions of condensation.

The use of the additional membrane area and/or energy needed to operate in this mode may sometimes be deemed to be preferable to the use of a multistage membrane separation step.

2. The raw gas stream to be treated is of low volume: A treatment process, comprising a membrane separation step that produces a condensable-component enriched permeate, followed by a condensation step, could be used. The permeate volume, however, will always be smaller than the feed volume to the membrane modules, and usually significantly smaller. If the condensation step is performed on the permeate stream, therefore, a compressor of small enough capacity to handle the permeate stream may not be available. As an alternative, the process of the invention could be used. In this case the compressor handles the full raw gas stream, and the high pressure off-gas from the condensation step passes to the membrane separation step. The enriched lower-pressure permeate stream is returned on the low-pressure side of the compressor. Thus no compressor in the low-volume permeate line is required.

3. The concentration of the condensable component in the raw gas stream fluctuates: The performance of a membrane separation system depends on the selectivity of the membrane, the membrane area used, the transmembrane pressure drop and the feed/permeate pressure ratio. The treated stream from the membrane separation operation frequently must meet a certain target composition. For example, the condensable component content might be required to be less than 0.1%. The system would then be designed and built so that the required amount of removal could be achieved, based on the nominal composition of the raw gas stream. If the raw gas stream contained 1% condensable component, for example, this would mean that the membrane system be built to achieve 90% removal. If the condensable component content of the raw gas stream were to rise to 1.5%, the treated stream from the membrane system would now have a condensable component concentration of 0.15%, substantially in excess of the target acceptable value. If the condensable component content of the raw gas stream were to rise to 2%, the treated stream from the membrane system would now have a condensable component concentration of 0.2%, double the acceptable value. Such fluctuations are not uncommon and may take many forms. A few representative, nonlimiting, examples are streams in which a substantially nonconstant condensable component concentration may be encountered are listed below.

1. Periodic cycling of the condensable component concentration between high and low values could occur because of the cyclic nature of the operation producing the raw gas stream.

2. Irregular bursts of higher or lower than average concentration could occur if the process producing the raw gas stream, or a process contributing to it, itself is irregular, such as a sensor-driven purge operation, for example.

3. The condensable component concentration may stay substantially constant, except for a surge of higher concentration during start-up of the process producing the raw gas stream.

4. The condensable component concentration may stay substantially constant, except for a period of low concentration during shutdown of the process producing the raw gas stream.

5. The condensable component concentration may stay substantially constant, except for occasional periods of higher or lower concentration as contributing processes come on-line or go off-line.

6. The condensable component concentration may stay substantially constant, except during periods of malfunction or emergency.

Figure 3:
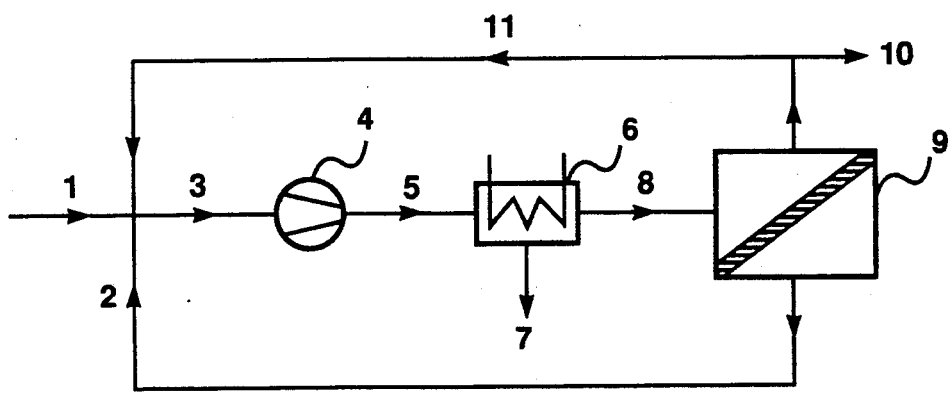
FIG. 3 shows an embodiment of the invention in which at least a part of the treated residue stream may be returned to the inlet side of the condenser.

These and other situations could be handled by adopting the process of the invention. According to the invention, the gas stream being fed to the membrane separation step is the off-gas from the condensation step, which will, in steady state, be saturated with condensable component under the prevailing pressure and temperature conditions. Thus the membrane separation step will always be exposed to the same concentration of condensable component in the feed, regardless of the concentration of the condensable component in the raw gas stream. This inherent, but previously unrecognized feature of hybrid processes, is very useful, because it provides a means for controlling the composition of emissions from membrane separation systems. Changes in the amount of condensable component in the incoming gas stream will affect the amount of liquefied product being recovered by the condenser, and hence will slightly affect the volume of the feed gas to the membrane separation step, but not its concentration. Thus, the composition of the treated gas stream discharged from the process will remain relatively constant, despite fluctuations in the raw gas composition. For more precise control of the residue composition, embodiments in which both the volume and the concentration of the feed stream to the membrane separation step are controlled are possible. FIG. 3 shows such as embodiment.

Referring now to this figure, like elements are the same as in FIG. 1. In this case, however, a portion, 11, of the residue stream may optionally be returned to the inlet side of the condenser. If the condensable component concentration of the raw gas stream rises above the nominal value for which the system was designed, the result is to increase the amount of liquefied product being withdrawn from the condenser. Consequently, the volume of off-gas will be correspondingly reduced. Thus the feed to the membrane step will be saturated as before, but the volume of the feed will be slightly less. An appropriate portion, 11, of the residue stream may then be fed back and reintroduced upstream of the membrane separation step, such as before the compressor or before the condenser, to "top up" the membrane feed gas stream to the volume for which it was designed. In this manner, both the volume of concentration of the feed gas entering the membrane separation step may be maintained approximately constant, thereby maintaining the composition of the residue stream approximately constant also. FIG. 3 shows stream 11 reintroduced before the compressor, thereby maintaining the compressor operation at capacity, but it could also be reintroduced at any other convenient point before the membrane unit.

4. The raw gas stream contains potentially explosive gas mixtures: The process of the invention may be used for handling gases and vapors that have the potential to form explosive mixtures. Carrying out the process of the invention, whereby the condensation step precedes the membrane separation step, will, as in the situation described in point 3 above, allow greater control over the composition of the treated stream.

Figure 4:
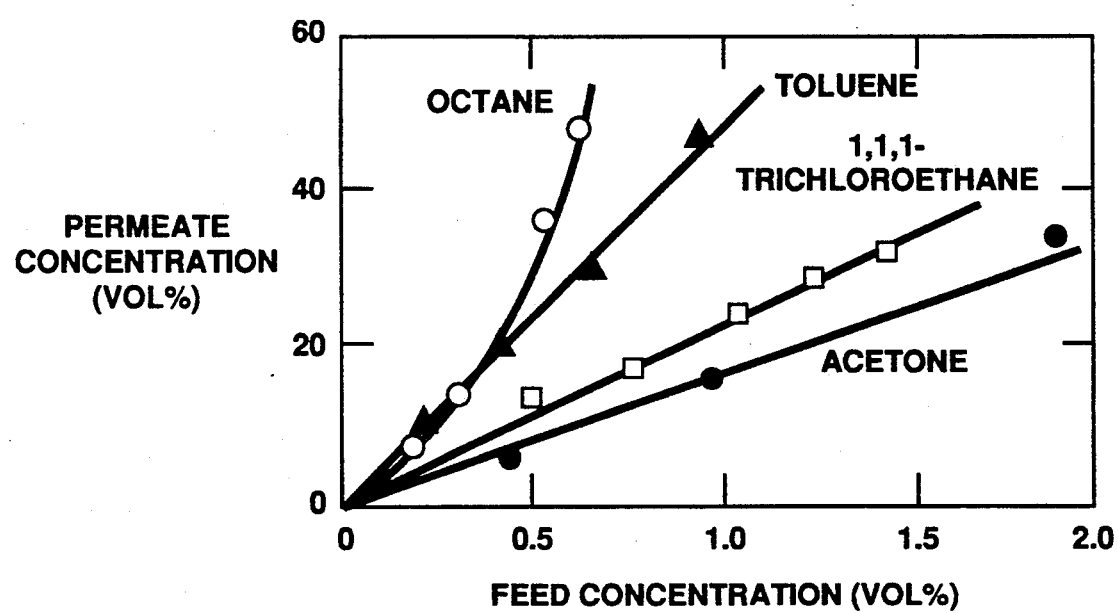
FIG. 4 is a graph showing the relationship between feed and permeate concentrations of acetone, 1,1,1-trichloroethane, toluene and octane.

FIGS. 1-3 show embodiments of the invention in which a single-stage membrane separation step is used. The process of the invention may, in some instances, be employed specifically to avoid the necessity for a multistage membrane separation step, as discussed above. However, embodiments using membrane arrays in multistage or multistep arrangements are also possible within the scope of the invention. The arrangement of the system elements used to carry out the process would be similar to FIGS. 3 or 4 of copending parent application U.S. Ser. No. 07/649,305, now U.S. Pat. No. 5,089,033, for example.

The invention is now further illustrated by the following examples, which are intended to be illustrative of the invention, but are not intended to limit the scope or underlying principles in any way.

EXAMPLES

The examples are in three groups. The first group covers the results obtained in a series of experiments carried out according to the general procedure described below. These experiments were performed to determine that separation of organic vapors from gas streams, with adequate selectivity, can be achieved. The experiments were performed with a single membrane module, usually operated at low stage cut, to optimize the concentration of organic vapor in the permeate stream. There was no attempt made in these simple experiments to control the concentration of organic in the residue stream. Having demonstrated that adequate separation is possible, the other groups of examples take representative separations and illustrate how hybrid systems for carrying out the process of the invention can be designed.

GROUP 1 EXAMPLES

Experimental procedure for single module experiments

All sample feedstreams were evaluated in a laboratory test system containing one spiral-wound membrane module. The test were run at room temperature. The air in the feed cycle was replaced with nitrogen from a pressure cylinder prior to the experiment. Nitrogen was continuously fed into the system during the experiment to replace the nitrogen lost into the permeate. Organic vapor was continuously fed into the system by either pumping liquid organic into the residue line using a syringe pump and evaporating the organic using additional heating, or sending a bypass stream of the residue through a wash bottle containing the liquid organic. The feed and residue organic concentrations were determined by withdrawing samples from the appropriate lines by syringe and then subjecting these to gas chromatograph (GC) analysis. A small bypass stream was used to take the samples at atmospheric pressure instead of the elevated pressure in the lines. Two liquid nitrogen traps were used to condense the organic contained in the permeate stream. A non-lubricated rotary-vane vacuum pump was used on the permeate side of the module. The permeate pressure used in the experiments was in the range 1-5 cmHg. The samples from the permeate stream were taken using a detachable glass vessel constantly purged with a bypass stream of the permeate. Upon sampling, the vessel was detached and air was allowed to enter the vessel. The concentration in the vessel was determined by gas chromatography. The permeate concentration was then calculated from the relationship: permeate conc.=vessel conc.×76 cmHg/permeate pressure (cmHg)

The procedure for a test with the system was as follows:

1. The system was run without organic under maximum permeate vacuum to replace the air in the loop with nitrogen.
2. The nitrogen permeate flow rate was determined by measuring the vacuum pump exhaust flow rate. This provided a quality check on the module.
3. The feed flow, feed pressure and permeate pressure were adjusted to the desired values. The cold trap was filled with liquid nitrogen.
4. The organic input was started and the feed concentration was monitored with frequent injections into the GC. The permeate pressure was adjusted if necessary.
5. The system was run until the feed analysis showed that steady state had been reached.
6. All parameters were recorded and a permeate sample was taken and analyzed.
7. Step 6 was repeated after 10-20 minutes. The feed concentration was monitored after each parameter change to ensure steady state had been reached.

EXAMPLE 1

The experimental procedures described above were carried out using a membrane module containing a composite membrane with an area of 1,100 cm$^2$. The feedstream comprised nitrogen and acetone, the acetone concentration in the feed varying from about 0.4% to 2%. A plot of acetone concentration in the feed against acetone concentration in the permeate is given by the lowest curve in FIG. 4. Typically the permeate was enriched about 18-fold compared with the feed. A feedstream containing 0.45% acetone yielded a permeate containing 8% acetone. The selectivity for acetone over nitrogen was found to be in the range 15-25, depending on the feed concentration of acetone and other operating parameters.

EXAMPLE 2

The experimental procedures described above were carried out using a membrane module containing a composite membrane with an area of 1,100 cm$^2$. The feedstream comprised nitrogen and 1,1,1-trichloroethane, the trichloroethane concentration in the feed varying from about 0.5% to 1.5%. A plot of trichloroethane concentration in the feed against trichloroethane concentration in the permeate is given by the second lowest curve in FIG. 4. Typically the permeate was enriched about 24-fold compared with the feed. A feedstream containing 0.5% trichloroethane yielded a permeate containing 13% trichloroethane.

EXAMPLE 3

The experimental procedures described above were carried out using a membrane module containing a composite membrane with an area of 1,100 cm$^2$. The feedstream comprised nitrogen and toluene, the toluene concentration in the feed varying from about 0.2% to 1%. A plot of toluene concentration in the feed against toluene concentration in the permeate is given by the third curve in FIG. 4. typically the permeate was enriched about 48-fold compared with the feed. A feedstream containing 0.65% toluene yielded a permeate containing 30% toluene.

EXAMPLE 4

The experimental procedures described above were carried out using a membrane module containing a composite membrane with an area of 1.100 cm$^2$. The feedstream comprised nitrogen and octane, the octane concentration in the feed varying from about 0.1% to 0.6%. A plot of octane concentration in the feed against octane concentration in the permeate is given by the uppermost curve in FIG. 4. Typically the permeate was enriched at least 50-60 fold compared with the feed. A feedstream containing 0.3% octane yielded a permeate containing 14% octane.

EXAMPLE 5

Figure 5:
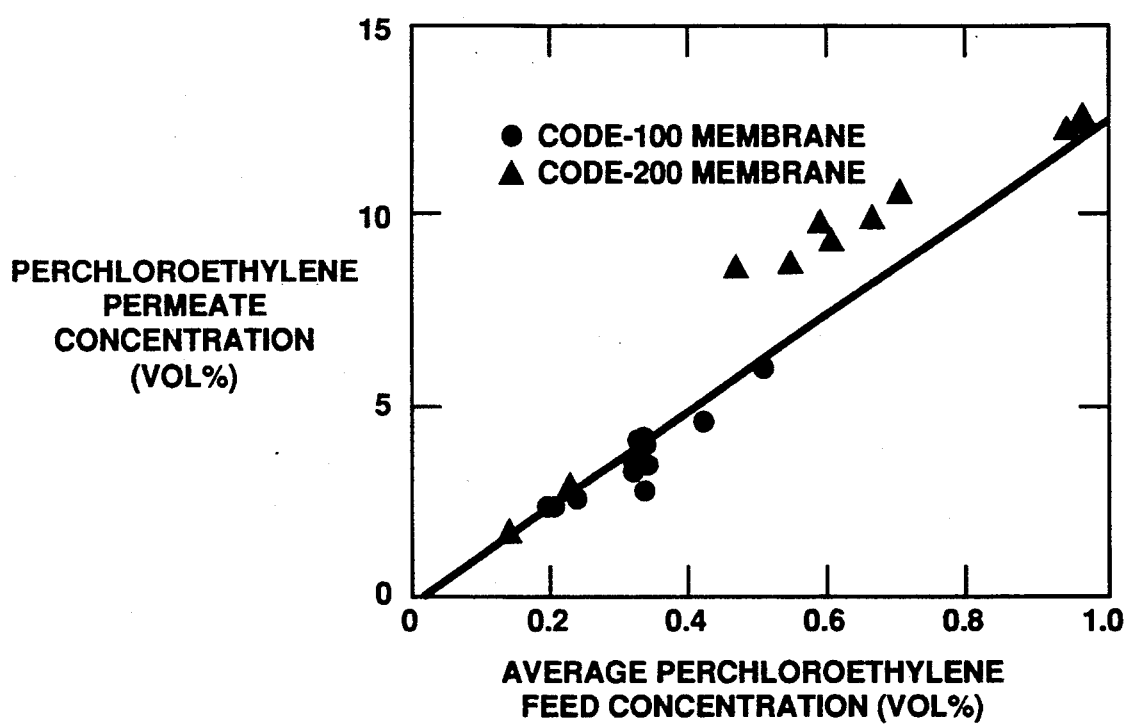
FIG. 5 is a graph showing the relationship between feed and permeate concentrations of perchloroethylene.

The experimental procedures described above were carried out using two different membrane modules containing composite membranes with different rubbers as the permselective layer, but both with membrane areas of 3.200 cm$^2$. The feedstream comprised nitrogen and perchloroethylene, the perchloroethylene concentration in the feed varying from about 0.2% to 0.8%. A plot of perchloroethylene concentration in the feed against perchloroethylene concentration in the permeate is given in FIG. 5. The open circles are for one module; the triangles for the other. Typically the permeate was enriched at least 10-12 fold compared with the feed. A feedstream containing 0.2% perchloroethylene yielded a permeate containing 2.2% perchloroethylene. A feedstream containing 0.5% perchloroethylene yielded a permeate containing 8.3% perchloroethylene.

EXAMPLE 6

Figure 6:
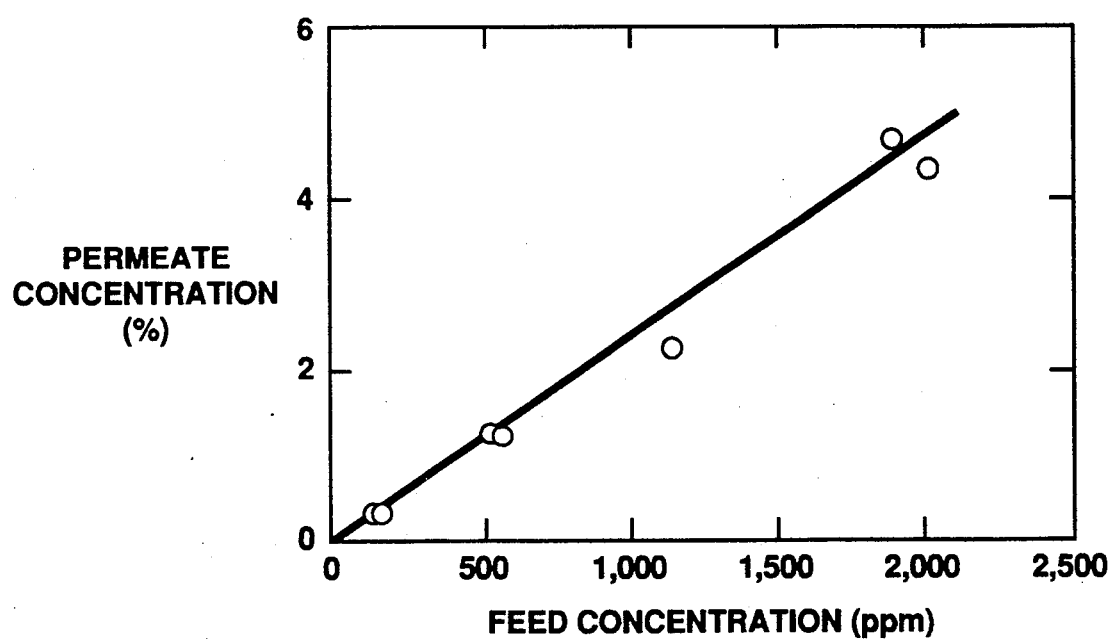
FIG. 6 is a graph showing the relationship between feed and permeate concentrations of CFC-11 at low CFC feed concentrations.

The experimental procedures described above were carried out using a feedstream containing CFC-11 (CCl$_3$F) in nitrogen in concentrations from 100-2,000 ppm. The module contained a composite membrane with an area of approximately 2,000 cm$^2$. The results are summarized in FIG. 6. The calculated CFC/N$_2$ selectivity of the module increased slightly from 22 at 100 ppm to 28 at 2,000 ppm.

EXAMPLE 7

Figure 7:
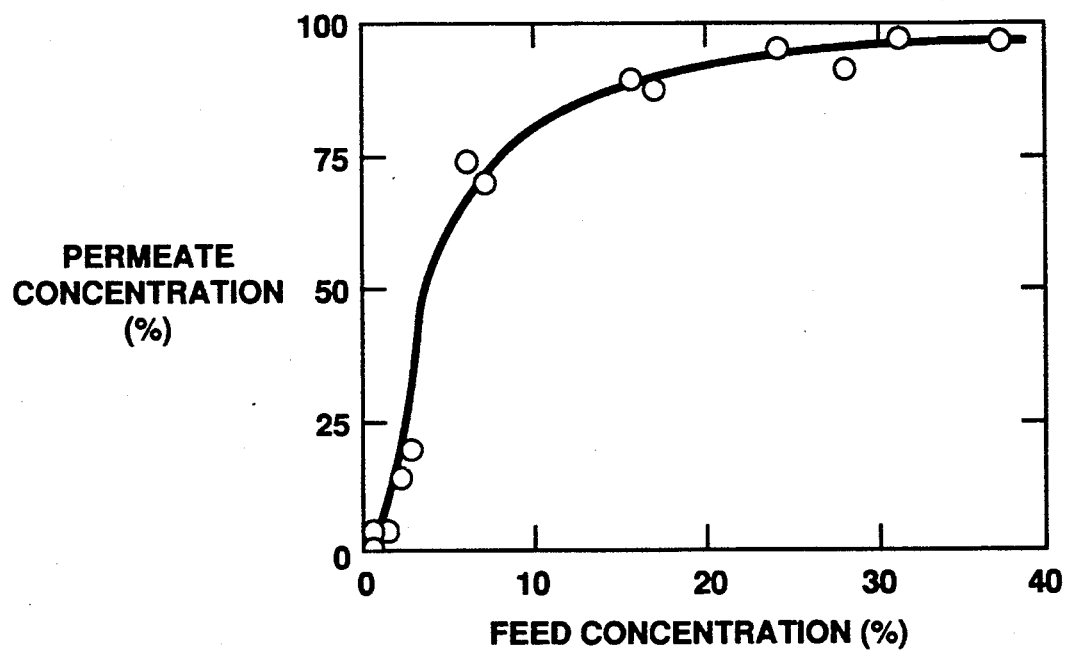
FIG. 7 is a graph showing the relationship between feed and permeate concentrations of CFC-11 at CFC feed concentrations up to about 35 vol %.

The experimental procedures described were carried out using a feedstream containing CFC-11 (CCl$_3$F) in nitrogen in concentrations from 1-35%. The module contained a composite membrane with an area of approximately 2,000 cm$^2$. The results are summarized in FIG. 7. The calculated CFC/N$_2$ selectivity of the module increased from 30 at 1 vol % to 50 at 35 vol %. effect may be attributable to plasticization of the membrane material by sorbed hydrocarbon. Both hydrocarbon and nitrogen fluxes increased with increasing hydrocarbon feed concentration. The selectivity for CFC-11 over nitrogen was found to be in the range 30-50.

EXAMPLE 8

Figure 8:
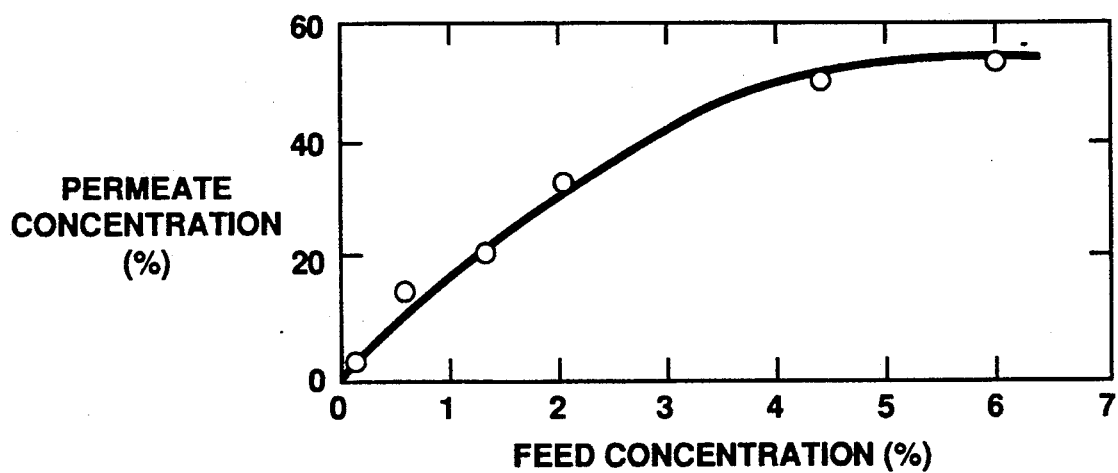
FIG. 8 is a graph showing the relationship between feed and permeate concentrations of CFC-113 at CFC feed concentrations up to about 6 vol %.

The experimental procedures described were carried out using a feedstream containing CFC-113 (C$_2$Cl$_3$F$_3$) in nitrogen in concentrations from 0.5-6%. The module contained a composite membrane with an area of approximately 2,000 cm$^2$. The results are summarized in FIG. 8. The calculated CFC/N$_2$ selectivity of the module remained constant at about 25 over the feed concentration range.

EXAMPLE 9

Figure 9:
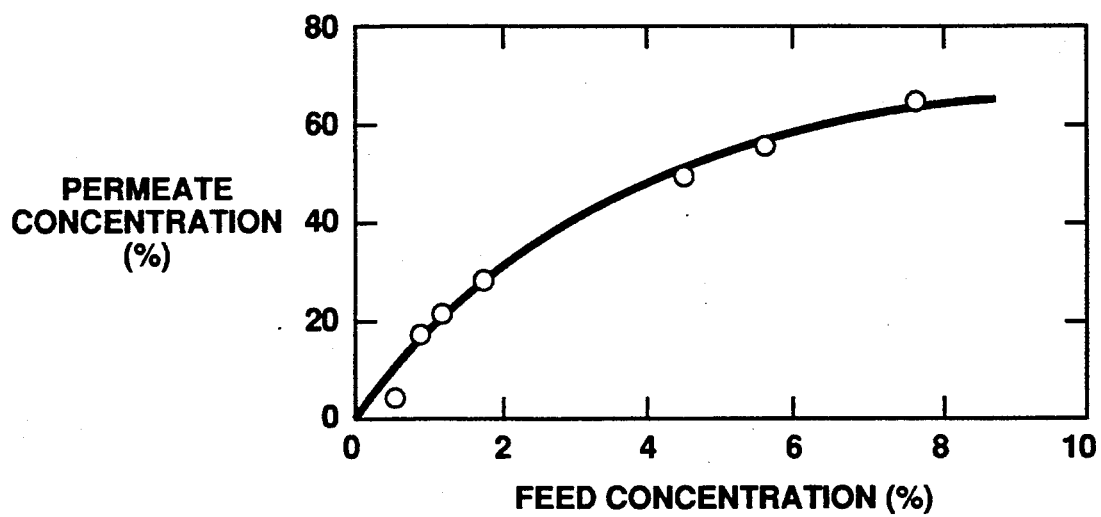
FIG. 9 is a graph showing the relationship between feed and permeate concentrations of HCFC-123 at feed concentrations up to about 8%.

The experimental procedures described were carried out using a feedstream containing HCFC-123 (C$_2$HCl$_2$F$_3$) in nitrogen in concentrations from 0.5-8%. The module contained a composite membrane with an area of approximately 2,000 cm$^2$. The results are summarized in FIG. 9. The calculated CFC/N$_2$ selectivity of the module remained constant at about 25 over the feed concentration range.

EXAMPLE 10

Figure 10:
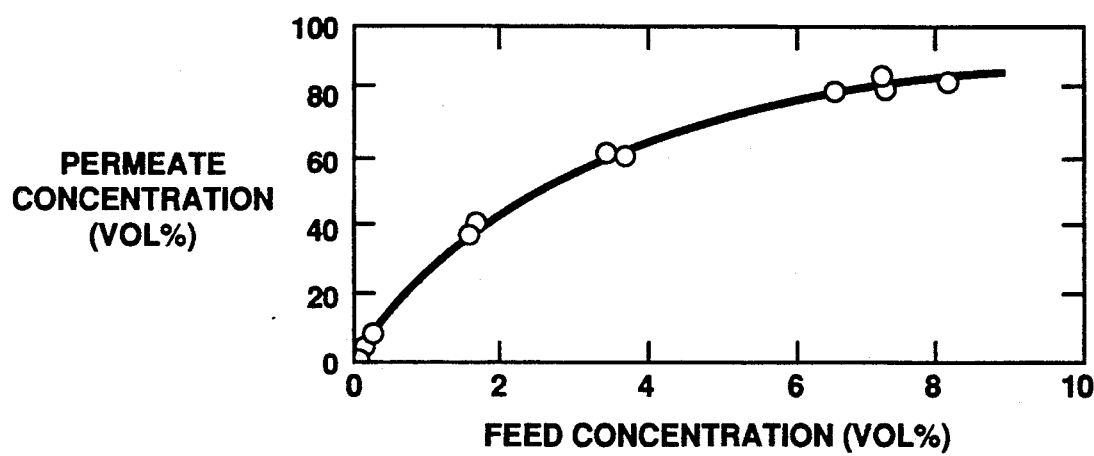
FIG. 10 is a graph showing the relationship between feed and permeate concentrations of methylene chloride at feed concentrations up to about 8%.

The experimental procedures described above were carried out using a membrane module containing a composite membrane with a area of 2,000 cm$^2$. The feedstream comprised nitrogen and methylene chloride, the methylene chloride concentration in the feed varying from about 0.1% to 8%. A plot of methylene chloride concentration in the feed against methylene chloride concentration in the permeate is given in FIG. 10. Typically the permeate was enriched about 30-fold compared with the feed at low feed concentrations. At higher concentrations the degree of enrichment dropped to about 10-20 fold. A feedstream containing 2% methylene chloride yielded a permeate containing 44% methylene chloride. A feedstream containing 8% methylene chloride yielded a permeate containing 84% methylene chloride.

EXAMPLE 11

A composite membrane was prepared by coating a support membrane with a permselective membrane made from a polyamide-polyether block copolymer having the following formula:

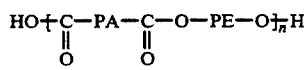

where PA is a polyamide segment, PE is a polyether segment, and n is a positive integer. A stamp of the membrane having an area of 12.6 cm² was tested at 61° C. with a gas mixture containing sulfur dioxide. The pressure on the permeate side of the test cell was maintained at 6.5 cmHg. The feed pressure was 90 cmHg. Permeation results are summarized in Table 1.

TABLE 1

Permeability Data for a Polyamide-polyether membrane

Temperature: 61° C.
Stage cut: 1.1%
Feed pressure: 90 cmHg
Permeate pressure: 6.5 cmHg

| Component | Feed composition (%) | Normalized flux cm³(STP)/cm²·s·cmHg | Selectivity |
|---|---|---|---|
| $N_2$ | 68.1 | $2.33 \times 10^{-5}$ | $SO_2/N_2$ 251 |
| $O_2$ | 5.8 | $5.37 \times 10^{-5}$ | |
| $CO_2$ | 8.2 | $6.05 \times 10^{-4}$ | $SO_2/CO_2$ 10.1 |
| $SO_2$ | 0.33 | $6.12 \times 10^{-3}$ | |
| $H_2O$ | 17.6 | $4.7 \times 10^{-3}$ | $SO_2/H_2O$ 1.3 |

EXAMPLE 12

A membrane selective for nitrogen over Halon 1301 was mounted in a test cell. The membrane was exposed to Halon 1301/nitrogen gas mixtures obtained by mixing nitrogen from a tank with pure Halon vapor from a liquid Halon reservoir. The pressure regulator on the nitrogen tank was used to adjust the pressure on the feed side of the membrane cell and a needle valve was used to adjust the flow of Halon into the feed stream. The Halon tank was heated to 40° C. to increase the Halon vapor pressure.

The compositions of the feed residue and permeate gas streams were determined using an on-line gas chromatograph. Bubble meters were used to determine the flow rates of the residue and permeate streams. The gas separation results are shown in Table 2.

TABLE 2

Separation Properties of a Modified MTR-300 Membrane with Halon 1301/Nitrogen Mixtures (Room Temperature, 200 psig pressure)

| Halon concentration (%) | | Selectivity | Nitrogen normalized flux |
|---|---|---|---|
| Feed | Permeate | Nitrogen/Halon | $10^{-6}$(cm³(STP)/cm²·s·cmHg) |
| 17.5 | 1.2 | 19 | 1.1 |
| 22 | 2.0 | 15 | 4.4 |
| 36 | 2.4 | 26 | 1.2 |
| 53 | 9.4 | 12 | 5.8 |

GROUP 2 EXAMPLES. System designs in accordance with the invention.

The membrane calculations for these examples are based on the condensable component selectivities determined in single module experiments of the type described in the first group of examples. The calculations were performed using an in-house computer program based on gas permeation equations for cross-flow conditions. The membrane are required was generated by the computer program. The capacities of the vacuum pumps and compressors were obtained or extrapolated from performance specification charts and other data from the manufacturers. Energy calculations were done by calculating the adiabatic ideal work of compression and dividing by the efficiency of the unit. Compressor efficiency was taken to be 66%: vacuum pump efficiency was taken to be 33%.

EXAMPLE 13

A process was designed to recover CFC-11 from air. The process scheme was as shown in FIG. 1. The raw gas stream 1 was assumed to contain 0.2 vol % CFC-11, and was mixed with the enriched stream 7, from the membrane separation step. The resulting CFC-11 laden stream is compressed to 150 psia, then chilled to 5° C. and condensed. The non-condensed off-gas from the condensation step is passed to the membrane separation step. The CFC-11/air selectivity was assumed to be 20, and the CFC-11 flux was assumed to be $1.6 \times 10^{-3}$ cm³(STP)/cm²·s·cmHg. A pressure drop across the membrane is provided only by the elevated pressure of the compressed feed. The compositions and flow rates of the various streams are given in Table 3, where the streams are identified by the same numbers as in FIG. 1.

TABLE 3

| Stream | CFC-11 concentration (vol %) | | Flow rate (scfm) |
|---|---|---|---|
| 1 | A | 0.2 | 100 |
| 3 | B | 4.9 | 278 |
| 5 | C | 4.8 | 277.5 |
| 2 | D | 7.5 | 178 |
| 10 | | 0.02 | 99.8 |
| 7 | | 100 | 1.7 kg/h |

Energy requirement of compressor: 93 hp
Membrane Area: 107 m²
Stage Cut: 64%
CFC-11 removal from feed: 90%

EXAMPLE 14

A process was designed to remove benzene from air. The process scheme was as shown in FIG. 1. The raw gas stream 1 was assumed to contain 0.2 vol % benzene, and was mixed with the enriched stream 7, from the membrane separation step. The resulting benzene-laden stream is compressed to 150 psia, then chilled to 5° C. and condensed. The non-condensed off-gas from the condensation step is passed to the membrane separation step. The benzene/air selectivity was assumed to be 40, and the benzene flux was assumed to be $3.2 \times 10^{-3}$ cm³(STP)/cm²·s·cmHg. A pressure drop across the membrane is provided only by the elevated pressure of the compressed feed. The compositions and flow rates of the various streams are given in Table 4, where the streams are identified by the same numbers as in FIG. 1.

TABLE 4

| Stream | Benzene concentration (vol %) | | Flow rate (scfm) |
|---|---|---|---|
| 1 | A | 0.2 | 100 |
| 3 | B | 0.56 | 156 |
| 5 | C | 0.45 | 155.8 |
| 2 | D | 1.21 | 56 |
| 10 | | 0.02 | 99.8 |
| 7 | | 100 | 1.0 kg/h |

Energy requirement of compressor: 53.7 hp
Membrane Area: 37.5 m²
Stage Cut: 36%
Benzene removal from feed: 90%

EXAMPLE 15

A process was designed to remove methylene chloride from air. The process scheme was as shown in FIG.

1. The raw gas stream 1 was assumed to contain 0.2 vol % methylene chloride, and was mixed with the enriched stream 7, from the membrane separation step. The resulting methylene chloride-laden stream is compressed to 150 psia, then chilled to 5° C. and condensed. The non-condensed off-gas from the condensation step is passed to the membrane separation step. The methylene chloride/air selectivity was assumed to be 30, and the methylene chloride flux was assumed to be $2.4 \times 10^{-3}$ cm$^3$(STP)/cm$^2$·s·cmHg. A pressure drop across the membrane is provided only by the elevated pressure of the compressed feed. The compositions and flow rates of the various streams are given in Table 5, where the streams are identified by the same numbers as in FIG. 1.

TABLE 5

| Stream | Methylene chloride concentration (vol %) | | Flow rate (scfm) |
| --- | --- | --- | --- |
| 1 | A | 0.2 | 100 |
| 3 | B | 2.44 | 212.4 |
| 5 | C | 2.36 | 212.2 |
| 2 | D | 4.43 | 112.4 |
| 10 |   | 0.02 | 99.8 |
| 7 |   | 100 | 1.1 kg/h |

Energy requirement of compressor: 72.8 hp
Membrane Area: 71.4 m$^2$
Stage Cut: 53%
Methylene chloride removal from feed: 90%

EXAMPLE 16

A process was designed to remove 1,1,1-trichloroethane from air. The process scheme was as shown in FIG. 1. The raw gas stream 1 was assumed to contain 0.2 vol % 1,1,1-trichloroethane, and was mixed with the enriched stream 7, from the membrane separation step. The resulting 1,1,1-trichloroethane-laden stream is compressed to 150 psia, then chilled to 5° C. and condensed. The non-condensed off-gas from the condensation step is passed to the membrane separation step. The 1,1,1-trichloroethane/air selectivity was assumed to be 40, and the 1,1,1-trichloroethane flux was assumed to be $3.2 \times 10^{-3}$ cm$^3$(STP)/cm$^2$·s·cmHg. A pressure drop across the membrane is provided only by the elevated pressure of the compressed feed. The compositions and flow rates of the various streams are given in Table 6, where the streams are identified by the same numbers as in FIG. 1.

TABLE 6

| Stream | 1,1,1-trichloroethane concentration (vol %) | | Flow rate (scfm) |
| --- | --- | --- | --- |
| 1 | A | 0.2 | 100 |
| 3 | B | 0.76 | 164.6 |
| 5 | C | 0.65 | 164.5 |
| 2 | D | 1.62 | 64.6 |
| 10 |   | 0.02 | 99.8 |
| 7 |   | 100 | 1.7 kg/h |

Energy requirement of compressor 56.6 hp
Membrane Area: 43 m$^2$
Stage Cut: 39%
1,1,1-trichloroethane removal from feed: 90%

EXAMPLE 17

A process was designed to removed n-pentane from air. The process scheme was as shown in FIG. 1. The raw gas stream 1 was assumed to contain 2 vol % n-pentane, and was mixed with the enriched stream 7, from the membrane separation step. The resulting n-pentane-laden stream is compressed to 150 psia, then chilled to 5° C. and condensed. The non-condensed off-gas from the condensation step is passed to the membrane separation step. The n-pentane/air selectivity was assumed to be 40, and the n-pentane flux was assumed to be $3.2 \times 10^{-3}$ cm$^3$(STP)/cm$^2$·s·cmHg. A pressure drop across the membrane is provided only by the elevated pressure of the compressed feed. The compositions and flow rates of the various streams are given in Table 7, where the streams are identified by the same numbers as in FIG. 1.

TABLE 7

| Stream | n-pentane concentration (vol %) | | Flow rate (scfm) |
| --- | --- | --- | --- |
| 1 | A | 2.0 | 100 |
| 3 | B | 4.01 | 208.6 |
| 5 | C | 3.09 | 206.6 |
| 2 | D | 5.86 | 108.6 |
| 10 |   | 0.02 | 98 |
| 7 |   | 100 | 10 kg/h |

Energy requirement of compressor: 68.5 hp
Membrane Area: 67.7 m$^2$
Stage Cut: 53%
n-pentane removal from feed: 99%

EXAMPLE 18

A process was designed to remove n-pentane from air. The process scheme was as shown in FIG. 1, with the addition of a vacuum pump in the membrane permeate line to lower the pressure on the permeate side to 2.5 psia. The raw gas stream 1 was assumed to contain 0.2 vol % n-pentane, and was mixed with the enriched stream 7, from the membrane separation step. The resulting n-pentane-laden stream is compressed to 150 psia, then chilled to 5° C. and condensed. The non-condensed off-gas from the condensation step is passed to the membrane separation step. The n-pentane/air selectivity was assumed to be 40, and the n-pentane flux was assumed to be $3.2 \times 10^{-3}$ cm$^3$(STP)/cm$^2$·s·cmHg. A pressure drop across the membrane is provided by the elevated pressure of the compressed feed combined with the reduced pressure on the permeate side. The compositions and flow rates of the various streams are given in Table 8, where the streams are identified by the same numbers as in FIG. 1.

TABLE 8

| Stream | n-pentane concentration (vol %) | | Flow rate (scfm) |
| --- | --- | --- | --- |
| 1 | A | 0.2 | 100 |
| 3 | B | 3.22 | 131 |
| 5 | C | 3.09 | 130.8 |
| 2 | D | 12.97 | 31 |
| 10 |   | 0.02 | 99.8 |
| 7 |   | 100 | 0.9 kg/h |

Energy requirement of compressor: 43.4 hp
Energy requirement of vacuum pump: 11.7 hp
Total energy requirement: 55.1 hp
Membrane Area: 16.8 m$^2$
Stage Cut: 24%
n-pentane removal from feed: 90%

EXAMPLE 19

A process was designed to recover acetone from air. The process scheme was as shown in FIG. 1, with the addition of a vacuum pump in the membrane permeate line to lower the pressure on the permeate side to 3 psia. The raw gas stream 1 was assumed to contain 0.1 vol % acetone, and was mixed with the enriched stream 7, from the membrane separation step. The resulting acetone-laden stream is compressed to 150 psia, then chilled to 3° C. and condensed. The non-condensed off-gas from the condensation step is passed to the membrane separation step. The acetone/air selectivity was assumed to be 15, and the acetone flux was assumed to be $1.2 \times 10^{-3}$ cm$^3$(STP)/cm$^2$·s·cmHg. A pressure drop across the membrane is provided by the elevated pressure of the compressed feed, combined with the reduced pressure on the permeate side. The compositions and flow rates of the various streams are given in Table 9, where the streams are identified by the same numbers as in FIG. 1.

TABLE 9

| Stream | Composition (vol % CFC-11) | | Flow rate (scfm) |
| --- | --- | --- | --- |
| 1 | A | 0.1 | 25 |
| 3 | B | 1.09 | 59.93 |
| 5 | C | 1.06 | 59.90 |
| 2 | D | 1.81 | 34.92 |
| 10 | | 0.0001 | 24.97 |
| 7 | | 100 | 0.1 kg/h |

Energy requirement of compressor: 18.7 hp
Energy requirement of vacuum pump: 12.5 hp
Total energy requirement: 31.2 hp
Membrane Area: 20 m$^2$
Stage Cut: 58%
Acetone removal from feed: 99%

EXAMPLE 20

A process was designed to separate Halon 1301 from nitrogen using the nitrogen-selective membrane of Example 12. The process scheme was as shown in FIG. 2. The raw gas stream 21 was assumed to contain 20 vol % Halon 1301, and was compressed to 375 psia, then mixed with the Halon-enriched residue stream 24, from the membrane separation step. The resulting Halon-laden stream is chilled to 15° C. and condensed. The non-condensed off-gas from the condensation step is passed to the membrane separation step. The Halon/nitrogen separation characteristics as in Example 12 were used for the calculation. A pressure drop across the membrane is provided only by the elevated pressure of the compressed feed. The compositions and flow rates of the various streams are given in Table 10, where the streams are identified by the same numbers as in FIG. 2.

TABLE 10

| Stream | Halon 1301 concentration (vol %) | | Flow rate (scfm) |
| --- | --- | --- | --- |
| 21 | A | 20 | 116 |
| 25 | B | 67.2 | 686 |
| 28 | C | 60 | 670 |
| 24 | D | 68.8 | 570 |
| 30 | | 7.5 | 100 |
| 27 | | 100 | 177 kg/h |

Energy requirement of compressor: 62.1 hp
Membrane Area: 730 m$^2$
Stage Cut: 17%
Halon 1301 removal from feed: 65%

GROUP THREE COMPARATIVE EXAMPLES

These examples compare the structural and functional attributes of a system and process according to the invention with systems and processes in which the membrane separation step precedes the condensation step.

EXAMPLE 21

A process was designed to remove n-pentane from air. The process scheme was as shown in FIG. 1. The raw gas stream 1 was assumed to contain 0.2 vol % n-pentane, and was mixed with the enriched stream 2, from the membrane separation step. The resulting n-pentane-laden stream is compressed to 150 psia, then chilled to 5° C. and condensed. The non-condensed off-gas from the condensation step is passed to the membrane separation step. The n-pentane/air selectivity was assumed to be 40, and the n-pentane flux was assumed to be $3.2 \times 10^{-3}$ cm$^3$(STP)/cm$^2$·s·cmHg. A pressure drop across the membrane is provided only by the elevated pressure of the compressed feed. The compositions and flow rates of the various streams are given in Table 11, where the streams are identified by the same numbers as in FIG. 1.

TABLE 11

| Stream | n-pentane concentration (vol %) | | Flow rate (scfm) |
| --- | --- | --- | --- |
| 1 | A | 0.2 | 100 |
| 3 | B | 3.17 | 208.1 |
| 5 | C | 3.09 | 208 |
| 2 | D | 5.92 | 108.1 |
| 10 | | 0.02 | 99.8 |
| 7 | | 100 | 0.9 kg/h |

Energy requirement of compressor: 69 hp
Membrane Area: 67.7 m$^2$
Stage Cut: 52%
n-pentane removal from feed: 90%

EXAMPLE 22

Figure 11:
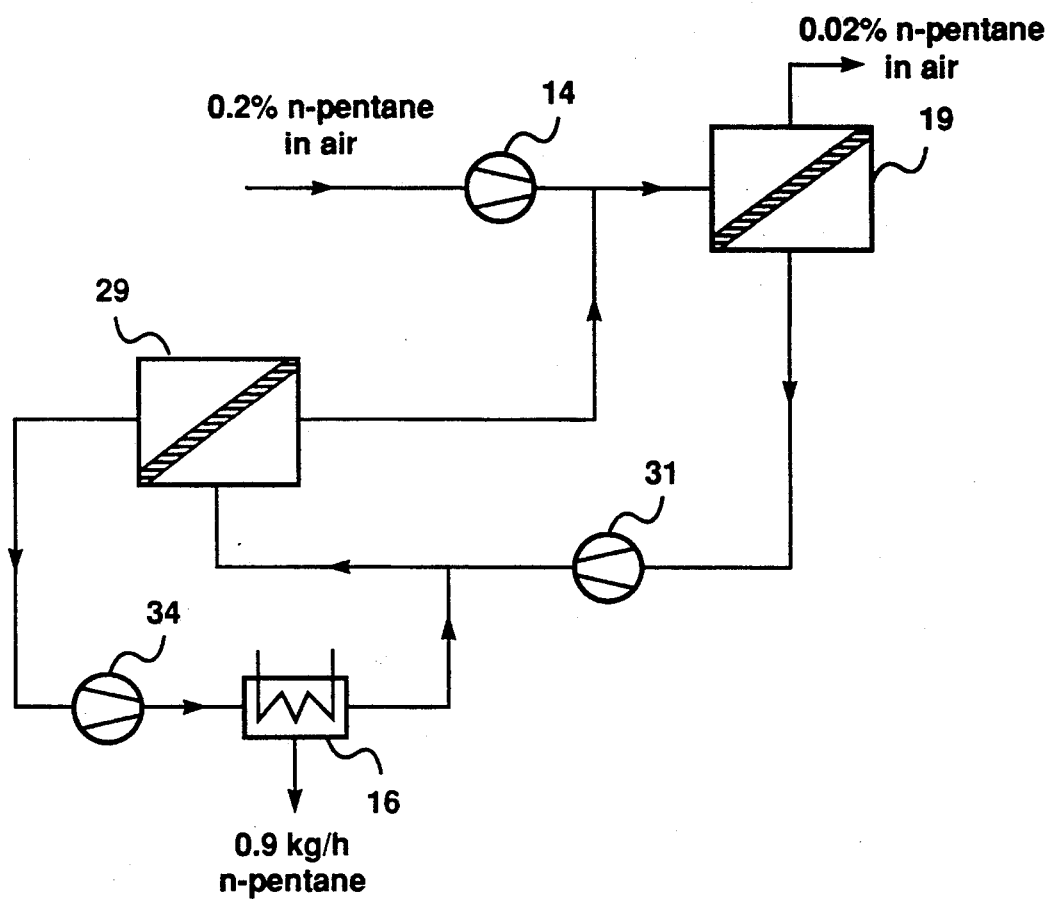
FIG. 11 shows an example of a process not in accordance with the invention, applied to a specific raw gas stream containing n-pentane.

A process was designed to remove n-pentane from air. As in Example 21, the raw gas stream was assumed to contain 0.2 vol % n-pentane and the residual n-pentane content was assumed to be reduced by 90% to 0.02%. The process involved passing the stream first to a membrane separation step, then to a condensation step. The membrane separation step uses two stages, with a compressor on the feed side of both stages, as shown in FIG. 11. A third compressor is used to compress the permeate stream from the second membrane stage prior to condensation. Thus, the system uses three compressors, 14, 31 and 34, two membrane stages, 19 and 29 and one condenser, 16. As in Example 21, the compressors achieved 150 psia on the high-pressure side and the condensation was performed at 5° C. The n-pentane/air selectivity was assumed to be 40, and the n-pentane flux was assumed to be $3.2 \times 10^{-3}$ cm$^3$(STP)/cm$^2$·s·cmHg. The calculated energy requirements and membrane area used are listed below.

| Energy requirements: | Compressor 14: | 47.5 hp |
| --- | --- | --- |
| | Compressor 24: | 13.4 hp |
| | Compressor 34: | 3.8 hp |
| | Total: | 64.6 hp |
| Membrane Area: | First stage 19: | 26.5 m$^2$ |
| | Second stage 29: | 6.9 m$^2$ |

| -continued | |
|---|---|
| Total: | 33.4 m² |

Comparison of Example 22 with Example 21 shows that the energy requirement is about the same in both cases. If the membrane separation step precedes the condensation step, the membrane area used is significantly less. However, the system design is significantly more complicated. In some circumstances, a simple design with fewer components may be advantageous, although using more membrane area.

EXAMPLE 23

Figure 12:
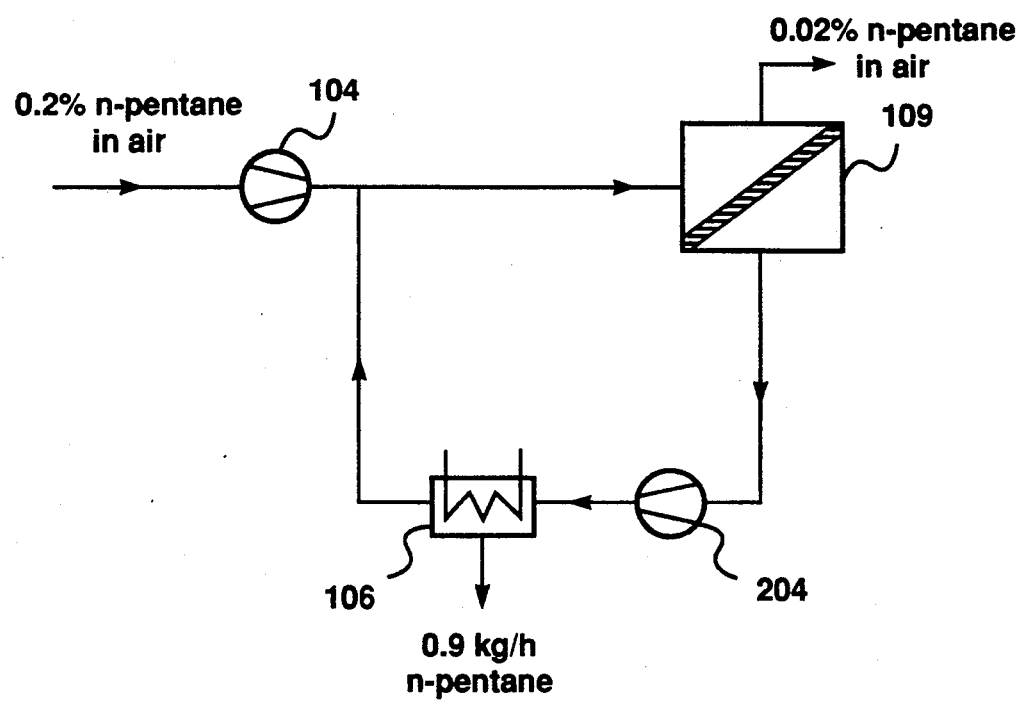
FIG. 12 shows an example of a process not in accordance with the invention, applied to a specific raw gas stream containing n-pentane.

A process was designed to remove n-pentane from air. As in Example 21, the raw gas stream was assumed to contain 0.2 vol % n-pentane and the residual n-pentane content was assumed to be reduced by 90% to 0.02%. The process involved passing the stream first to a membrane separation step, then to a condensation step. The membrane separation step uses one stage, with a compressor on the feed side, as shown in FIG. 12. A second compressor is used to compress the permeate stream from the membrane separation step prior to condensation. Thus, the system uses two compressors, 104 and 204, one membrane stage, 109, and one condenser, 106. As in Example 21, the compressors achieved 150 psia on the high-pressure side and the condensation was performed at 5° C. The n-pentane/air selectivity was assumed to be 40, and the n-pentane flux was assumed to be $3.2 \times 10^{-3}$ cm³(STP)/cm²·s·cmHg. The calculated energy requirements and membrane area used are listed below.

| Energy requirements: | Compressor 104: | 33.8 hp |
|---|---|---|
| | Compressor 204: | 28.8 hp |
| | Total: | 62.6 hp |
| Membrane Area: | | 56.6 m² |

Comparison of Example 23 with Example 21 shows that the energy requirement is about the same in both cases. If the membrane separation step precedes the condensation step, the membrane area used is about 16% less. However, the system design requires two compressors. In some circumstances, a simple design with fewer components may be advantageous, although using more membrane area.

We claim:

1. A process for recovering a condensable component, characterized by a boiling point higher than −100° C., from a raw gas stream, comprising the steps of:
   (a) providing a raw gas stream containing a low concentration, A, of a condensable component, said concentration A being below saturation under the condensation conditions of step (c);
   (b) mixing said raw gas stream with a product stream from a membrane separation step, said product stream containing a concentration, D, of said condensable component to form an incoming gas stream containing a concentration, B, of said condensable component;
   (c) performing a condensation step, comprising:
      bringing said incoming gas stream to a pressure and temperature condition characterized in that said concentration B is greater than the saturation concentration of said condensable component at said pressure and temperature condition, so that condensation of a portion of said condensable component occurs;
      withdrawing a condensed stream comprising said condensable component in liquid form;
      withdrawing a non-condensed stream containing a concentration, C, of said condensable component;
   (d) passing said non-condensed stream as a feed stream to said membrane separation step; wherein said concentration A is less than said concentration C and said concentrations A, B, C and D are in the relative relationship A<C<B<D.

2. The process of claim 1, wherein said condensation step includes compressing said incoming gas stream.

3. The process of claim 2, wherein said condensation does not raise the pressure of said incoming gas stream above 15 atmospheres.

4. The process of claim 1, wherein said condensation step includes chilling said incoming gas stream.

5. The process of claim 4, wherein said chilling does not lower the temperature of said incoming gas stream below 0° C.

6. The process of claim 1, wherein said condensation step is carried out by indirect condensation.

7. The process of claim 1, wherein said condensation step is carried out by direct condensation into a coolant liquid.

8. The process of claim 1, wherein said product stream is a permeate stream from said membrane separation step.

9. The process of claim 1, wherein said product stream is a residue stream from said membrane separation step.

10. The process of claim 1, wherein said membrane separation step uses a composite membrane comprising a microporous support layer and a thin permselective coating layer.

11. The process of claim 1, wherein said membrane separation step uses a membrane having a selectivity for said condensable component compared with a second component of said incoming gas stream of at least 5.

12. The process of claim 1, wherein said membrane separation step uses a membrane having a selectivity for said condensable component compared with a second component of said incoming gas stream of at least 10.

13. The process of claim 1, wherein at least 80% of said condensable component is recovered.

14. The process of claim 1, wherein at least 90% of said condensable component is recovered.

15. The process of claim 1, wherein said condensable component comprises an organic vapor.

16. The process of claim 1, wherein said condensable component comprises a hydrocarbon vapor.

17. The process of claim 1, wherein said condensable component comprises a gasoline vapor.

18. The process of claim 1, wherein said condensable component comprises a halocarbon vapor.

19. The process of claim 1, wherein said condensable component comprises a fluorocarbon vapor.

20. The process of claim 1, wherein said condensable component comprises a chlorinated hydrocarbon vapor.

21. The process of claim 1, wherein said condensable component comprises an inorganic vapor.

22. The process of claim 1, wherein said concentration A is less than 80% of said concentration C.

23. The process of claim 1, wherein said concentration A is less than 60% of said concentration C.

24. The process of claim 1, wherein said concentration A is less than 50% of said concentration C.

25. The process of claim 1, wherein said concentration A is less than 30% of said concentration C.

26. The process of claim 1, wherein said concentration A is less than 20% of said concentration C.

27. The process of claim 1, wherein said concentration A is less than 10% of said concentration C.

28. The process of claim 1, wherein a driving force for said membrane separation step is provided by a compressor upstream of said membrane separation step.

29. The process of claim 1, wherein a driving force for said membrane separation step is provided, at least in part, by a vacuum pump connected to a permeate side of said membrane separation step.

30. The process of claim 1, further comprising drying said raw gas stream at a point prior to said condensation step.

31. The process of claim 30, wherein said drying is achieved by an additional condensation step.

32. The process of claim 30, wherein said drying is achieved by sorption of water vapor.

33. The process of claim 30, wherein said drying is achieved by an additional membrane separation step.

34. The process of claim 1, further comprising heating said non-condensed stream prior to said membrane separation step.

* * * * *